Aug. 10, 1954     H. H. H. EICHHORN     2,685,875
WARM AIR HEATING FURNACE

Filed Jan. 14, 1950     3 Sheets-Sheet 1

INVENTOR.
Hermann H. H. Eichhorn.
BY
Frank C. Fearman.
ATTORNEY

Aug. 10, 1954          H. H. H. EICHHORN          2,685,875
                     WARM AIR HEATING FURNACE
Filed Jan. 14, 1950                                3 Sheets-Sheet 2

INVENTOR.
Hermann H. H. Eichhorn.
BY
Frank C. Fearman.
ATTORNEY

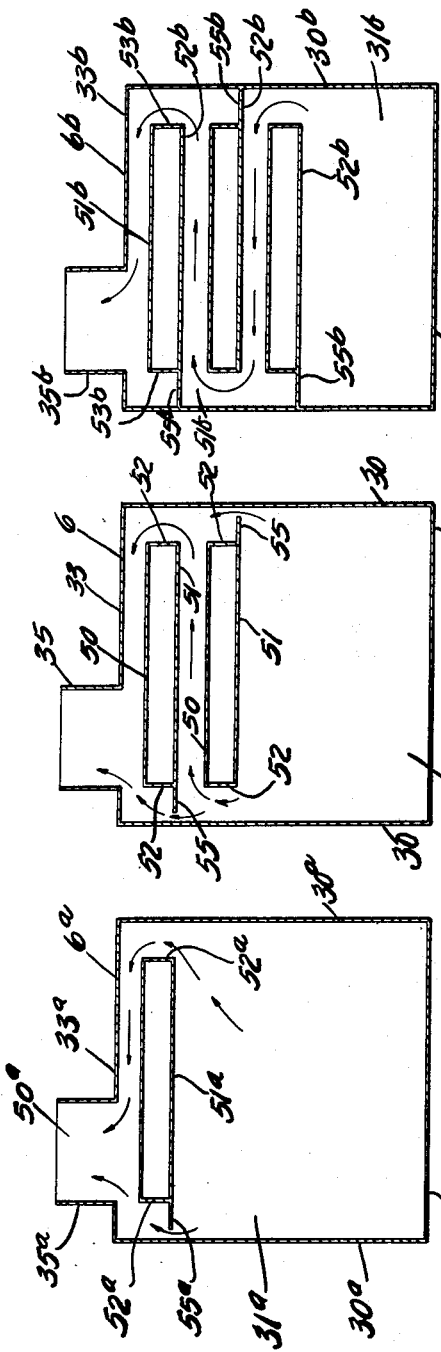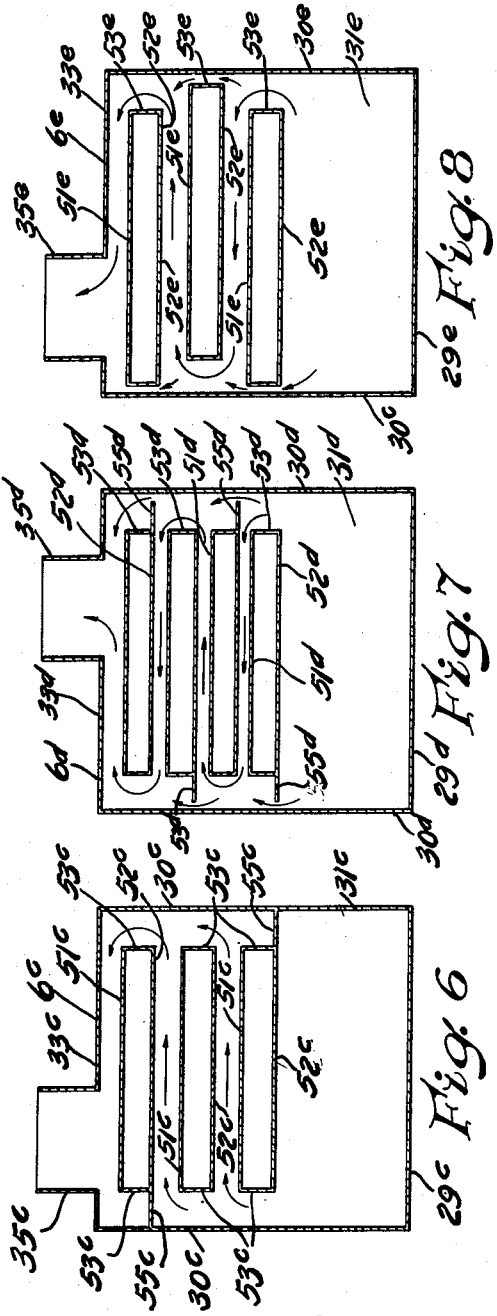

Patented Aug. 10, 1954

2,685,875

UNITED STATES PATENT OFFICE 2,685,875

WARM AIR HEATING FURNACE

Hermann H. H. Eichhorn, Saginaw, Mich., assignor to Jackson & Church Company, Saginaw, Mich.

Application January 14, 1950, Serial No. 138,640

22 Claims. (Cl. 126—110)

The present invention relates to improvements in heating furnaces, and more particularly to a warm air heating furnace for domestic and mobile installations.

One object of the invention is to provide a highly efficient warm air furnace which is comparatively simple in construction and requires a minimum amount of space and less heating surface compared with present day furnace structures of substantially the same efficiency rating.

Another object is to provide a warm air heating furnace structure which can be quickly and easily manufactured and can be conveniently assembled in various heating installations, both domestic and industrial as well as mobile types.

Another object is to provide a warm air furnace which includes a prismatic or box-like body in which the fire box and heat exchanger are arranged such as to produce the greatest possible efficiency and to permit the air to be heated during its continuous travel through the heat exchanger.

Another object is to provide a warm air heating furnace in which the products of combustion pass from opposite sides of the fire box and follow a sinuous pathway to and fro over the large surfaces of the heat exchanger, thus providing greater distribution of the furnace gases with a resultant increase in heating efficiency.

Another object is to provide a warm air heating furnace structure in which the furnace gases pass upwardly in a zig-zag to and fro manner over the surfaces of the heat exchanger adjacent both ends thereof, whereby the surfaces of the heat exchanger passageways will be heated equally throughout their entire lengths.

Another object is to provide a warm air heating furnace structure in which relatively large surfaces of the heat exchanger are presented to the sinuous pathway of the products of combustion from the fire box, said surfaces being formed of a metal of thin section having high heat conducting qualities to rapidly transmit heat to the air passing through the heat exchanger.

Another object is to provide a warm air heating furnace in which the heat exchanger is provided with passageways adjacent each end to permit a certain portion of the hot furnace gases to pass around each side edge of the heat exchanger unit adjacent its ends and thus further increase the efficiency of the furnace and prevent cold spots in the end areas.

Another object is to provide a warm air furnace having a fire box which is provided with at least two opposed openings for the passage of hot furnace gases, such that the furnace gases will pass upwardly and be directed towards the ends as well as the central portion of the heat exchanger directly above the fire box.

Another object is to provide a warm air heating furnace which includes a rectangular housing within which a similarly shaped heat exchanger casing is located and spaced therefrom to provide passageways on all sides of the heat exchanger casing for the passing of air to be heated.

Another object is to provide a warm air heating furnace of the above type in which the heat exchanger is formed of a rectangular casing having relatively large flat ducts of rectangular section arranged horizontally in superposed spaced relation for the passage of air from one end of the casing to the other. Certain of said ducts being provided with baffles along their edges to direct the furnace gases in a zig-zag to and fro manner.

Another object is to provide a warm air furnace with a heat exchanger casing having large flat ducts arranged in superimposed offset and staggered relation to cause the furnace gases to pass to and fro in a zig-zag fashion.

Another object is to provide a warm air heating furnace in which the heat exchanger is formed of relatively flat ducts of sufficient length to overhang the firebox on each side thereof so that the hot gases from the opposite sides of the firebox will pass upwardly over the surfaces of the heat exchanger at each end thereof as well as the central portion.

Other objects and advantages of the invention will become apparent during the course of the following description of the accompanying drawings, wherein:

Figure 3 is a vertical cross-sectional view of a heat exchanger similar to the heat exchanger shown in Figures 1 and 2, but employing a single air duct.

Figure 4 is a vertical cross-sectional view of the heat exchanger shown in Figures 1 and 2 in which a pair of flat air ducts are arranged in superposed relation with continuations of the bottom walls extended in staggered relation to provide baffles.

Figure 5 is a vertical cross-sectional view of a modified form of the invention showing three flat air ducts arranged in superposed relation with alternately extending portions or the bottom walls providing baffles between the ducts and the side wall casing of the heat exchanger.

Figure 6 is a vertical cross-sectional view of another modified form of the invention in which the heat exchanger is comprised of three superposed flat air ducts with extensions on the upper and lower air ducts to provide baffles to cause the furnace gases to travel along a sinuous pathway.

Figure 1:
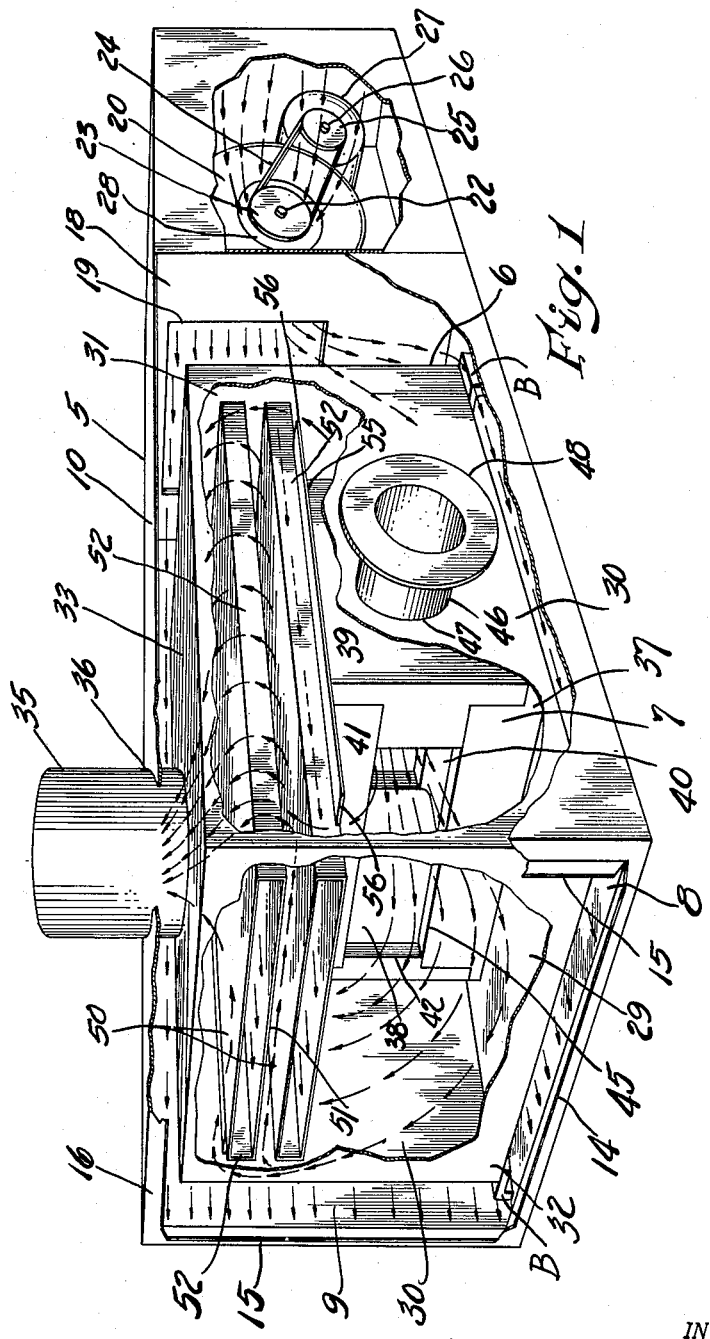
Figure 1 is a perspective view of the warm air heating furnace showing the side walls of the casing and heat exchanger broken away to illustrate the manner in which the heat exchanger is arranged relative to the firebox, and to enable the air and furnace gas flow to be easily discerned by the arrows.

Figure 7 is a vertical cross-sectional view of another modified form of the invention wherein the heat exchanger is formed by four superposed flat air ducts with opposite and alternately extending flanges to provide partial baffles between the air ducts and the heat exchanger casing walls, and Figure 8 is a vertical cross-sectional view of a still further modified form of the invention in which the superposed flat air ducts are arranged in spaced apart staggered relation to form a sinuous pathway for the upwardly traveling furnace gases.

In the drawings, and more in detail there is shown for the purpose of convenience of illustration a furnace casing generally designated 5 (Figs. 1 and 2) in one end of which is mounted a heat exchanger 6 and a firebox 7 likewise generally designated. The furnace casing 5 includes a bottom wall 8, side walls 9 and a top wall 10. The ends of the casing 5 are open and are adapted to be closed by covers 11 and 12 which are held in place in a conventional manner by outwardly extending portions 14, 15 and 16 on the flanged ends of the bottom, side and top walls 8 to 10 inclusive. The cover members 11 and 12 are provided with suitable louvers to permit air passage through the casing in the direction of the arrows (Figure 1), or in the event that the furnace is used in a domestic dual-duct heating system, the opening in the cover member 11 may be placed in registry with the return duct of the system in a conventional manner, while the opening in the cover 12 is connected to the supply duct of the system likewise in a conventional manner.

The casing 5 is provided adjacent one end with a vertical partition wall 18 having a central opening 19 for dividing the furnace casing into blower and heater compartments as illustrated in Figure 1. On one side of the partition 18 a centrifugal air blower casing 20 is located and the discharge opening in the casing is arranged in registry with the opening 19. The casing 20 adjacent the discharge opening is provided with flanges which are adapted to interlockingly engage correspondingly positioned flanges about the opening 19 to secure the casing 20 in position. The rotary shaft 22 of the centrifugal blower is provided with a pulley 23 over which is trained a drive belt 24 which is drivingly connected to a pulley 25 affixed to the armature shaft 26 of an electric motor 27. The motor 27 is adjustably supported on the volute blower casing 20 in a conventional manner, and the side walls of the volute blower casing 20 are provided with openings 28 to permit the entrance of air in the direction of the arrows shown at the right hand side of the casing (Fig. 1).

The heat exchanger casing 6 forms an inner furnace casing and includes a bottom wall 29, side walls 30, end walls 31 and 32 and a top wall 33. The bottom, side, end and top walls 29 to 33 inclusive are spaced from the bottom, side and top walls 8 to 10 inclusive of the outer furnace casing to form an air space therearound through which air is forced by the centrifugal blower 20. It is to be noted that the end wall 31 of the heat exchanger casing 6 is spaced from the partition wall 18 and likewise, the end wall 32 of the heat exchanger casing is spaced from the closure or louver panel 12. An opening is formed in the top wall 33 of the inner heat exchanger casing 6 and is provided with a short flue pipe section 35 which projects through an opening 36 in the top wall 10 of the outer furnace casing 5.

Mounted within the heat exchanger casing 6 is a firebox 7 which includes a bottom wall 37 connected to upright end walls 38 and 39. The bottom wall 37 is provided with upwardly projecting side wall portions 40 which are interlockingly fitted to the lower portions of the rear and front walls 38 and 39. A top wall likewise extends between the rear and front walls 38 and 39 of the firebox and has depending side wall portions 41 which interlockingly engage within cut away portions in side wall projections 42 and 43 of said rear and front walls 38 and 39 respectively. Thus, side openings 45 are formed in the side walls of the firebox and said openings are arranged in opposed relation such that the hot furnace gases passing from the firebox will flow laterally in opposite directions toward both ends of the inner heat exchanger casing 6. The front wall 39 of the firebox 7 is provided with a collar 46 which projects through the inner heat exchanger casing wall 30 through an opening 47 therein, and said collar also projects through a correspondingly positioned opening in the side wall 9 of the outer furnace casing 5. A flange 48 is formed on the collar 46 and said collar is adapted to accomodate a gun-type oil burner so that its nozzle projects through the collar 46 and into the firebox in a conventional manner. The nozzle of the oil burner being usually provided with a flange which can be bolted or otherwise affixed to the flange 48 in a conventional manner. The firebox 7 can be constructed of firebrick sections to form the bottom, rear, front and top walls or if desired, a stainless steel casing may be used having openings in its side walls corresponding in shape and position to the openings 45 as illustrated. It is to be noted, that the firebox is supported on the lower wall 29 of the inner heat exchanger casing 6 and the end walls 40 of the firebox are spaced a considerable distance from the end walls 31—32 of the inner heat exchanger casing 6 to provide flow chambers for the hot furnace gases at both ends of the heat exchanger casing.

The heat exchanger casing 6 is supported and casing above the bottom wall 8 of the outer furnace casing 5 by suitable supports or brackets B so that forced air circulation created by the fan 20 will pass on all four sides of the heat exchanger casing and completely encompass said casing.

Figure 2:
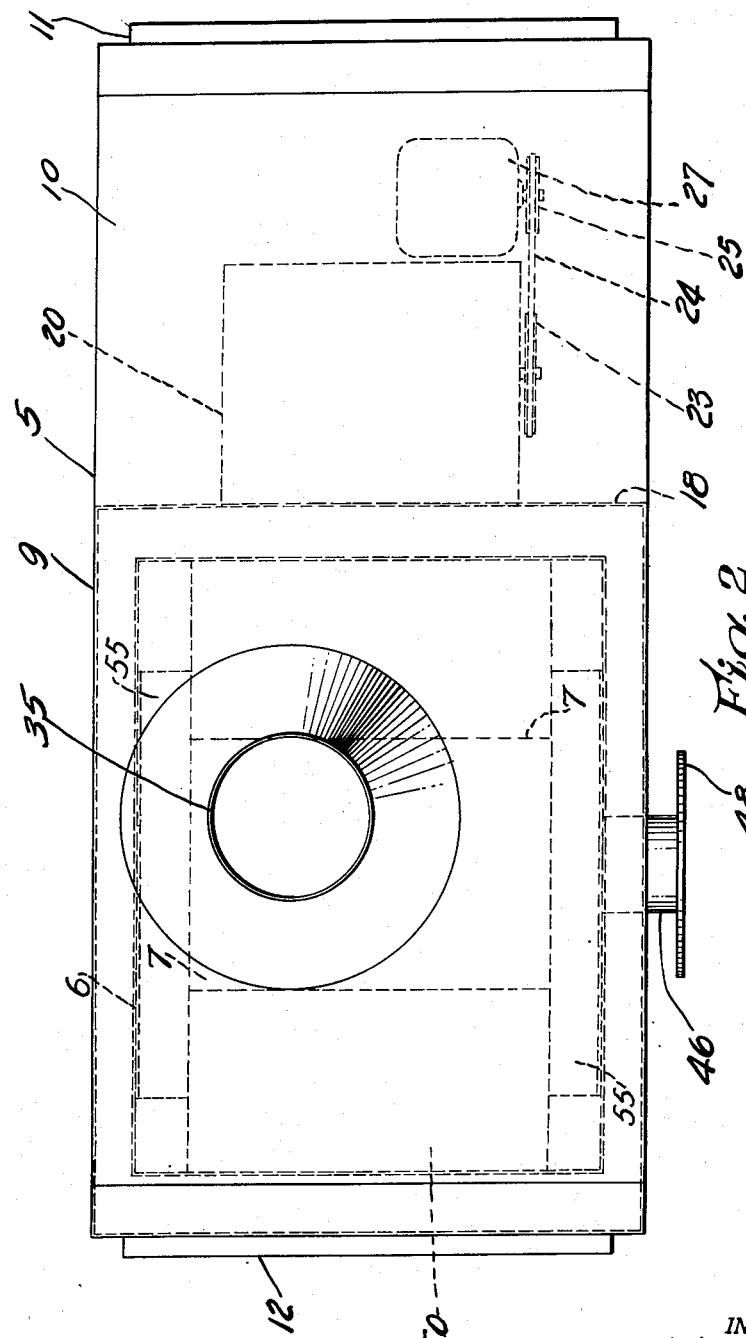
Figure 2 is a top elevational view of the warm air heating furnace showing the manner in which the heat exchanger is spaced from the furnace casing walls.

In the preferred embodiment of the invention shown in Figs. 1, 2 and 4, the inner heat exchanger casing 6 is provided with a pair of horizontally extending relatively flat air ducts which are formed of upper and lower walls 50 and 51 of a metal having high heat conducting characteristics. The walls 50 and 51 are spaced and are provided with connecting end walls 52 which extend longitudinally in spaced parallel relation with the side walls 30 of the heat exchanger casing 6. The ends of the air ducts formed by the walls 50 to 51 inclusive extend through correspondingly shaped openings (not shown) in the end walls 31 and 32 of the heat exchanger casing so that one open end of each air duct is presented to the forced air circulation passing through the opening 19, while the opposite ends which extend through the wall 32 are presented to the discharge opening of the furnace casing 5 in the cover member 12.

Formed on the lower wall 51 of each of the air ducts is a projection 55 which is a continuation of the bottom wall and extends longitudinally in spaced relation from the side walls 30 of the heat exchanger inner casing 6. The extensions 55 terminate as at 56 a short distance from the end walls 31 and 32 of the heat exchanger casing 6 to provide openings for the passage of hot furnace gases around the ends of the projections. It being noted that the projections or extensions 55 of the bottom walls 51 are arranged in staggered relation to form a sinuous furnace gas passageway from each side of the firebox 7 to the flue pipe collar 35. Also, it is to be noted that the projections or extensions 55 terminate a short distance from the side walls 30 to provide a small space between which a portion of the hot furnace gases may pass. This structure has the effect of heating the side walls 30 of the heat exchanger casing 6 on the outside of which air is forced in surface contacting relation by the centrifugal blower 20. In the vertical cross-sectional view shown in Figure 4 the projections or extensions 55 of the bottom walls 51 form baffles which are alternately arranged to form a sinuous furnace gas passageway.

It is to be noted that the air ducts are arranged (Fig. 1) in superposed relation with the bottom wall 51 of the lower air duct extending over the top wall 41 of the firebox 7 so that end portions of the air duct extend over and beyond the furnace gas openings 45. Thus, the hot furnace gases pass upwardly at each end of the air ducts and follow a sinuous pathway as indicated by the arrows in their travel from the firebox 7 to the flue pipe collar 35. It is also to be noted that heat is conducted to the central portion of the lowermost air duct directly from the firebox 7 so that the surfaces of the central portions of the air ducts will be heated by convection currents set up by heat transmitted or conducted through the walls 51 and 52, which are of relatively thin section and permit rapid heat transmission. Thus, the air ducts in the heat exchanger casing 6 are heated uniformly throughout their length such that all of the surfaces will transmit heat to the air passing therethrough.

It will be obvious, that different numbers of air ducts may be employed and various arrangements may be accomplished as shown in the modified forms of the invention. For instance, in the modified form of the invention shown in Figure 3, the heat exchanger casing 6a is similar to that shown in Figs. 1, 2 and 4, and includes bottom, side and end walls 29a to 33a inclusive. The heat exchanger casing 6a is intended to be used in conjunction with the furnace casing assembly 5 (Figs. 1, 2 and 3), and in this form of the invention a single air duct is provided in the upper portion of the heat exchanger casing, and said duct is formed of upper and lower metal sheets 50a and 51a of relatively thin section which extend the length of the casing 6a and are connected by end walls 52a. The end walls 52a are spaced from the side walls 30a of the casing 6a to provide a space for the passage of hot furnace gases therebetween. The lower wall 51a is provided with an extension 55a which forms a baffle similar to the baffle 55 in Figs. 1, 2 and 4, and said baffle terminates a short distance from one of the side walls 30a to provide a small furnace gas passageway. The baffle wall 55a terminates a short distance from the end walls 31a of the casing 6a and openings are provided in the end walls (not shown) for the passage of air from the forced circulation source as previously described.

In the modified form of the invention shown in Figure 5, the heat exchanger casing 6b is substantially the same as that shown in Figs. 1, 2 and 4, with the exception that three superposed elongated flat air ducts are employed in lieu of those shown. The heat exchanger casing 6b is provided with a bottom wall 29b, side walls 30b and a top wall 33b. The superposed air ducts are formed of flat metal plates 51b and 52b of relatively thin section and are connected along their side edges by side walls 53b. The air ducts are supported by the end walls 31b and have their open ends extending through correspondingly shaped openings for the circulation of air to be heated from the forced circulation source. The lower walls 52b of each of the air ducts are provided with alternately arranged baffle walls 55b to form a sinuous passageway for the hot furnace gases which pass from the firebox (not shown) to the flue pipe collar 35b. It is noted that the baffle walls 55b extend to the walls 30b of the casing, but the end portions may terminate a slight distance from the end walls 31b to provide slight openings of small area for the passage of furnace gases at the extreme ends of the air ducts.

In the modified form of the invention shown in Figure 6, the heat exchanger casing 6c includes a bottom wall 29c, side walls 30c, top and end walls 33c and 31c. In this form of the invention there is shown three air ducts arranged in horizontal superposed relation which include upper and lower sheet metal walls 51c and 52c connected along their edges by side walls 53c. The upper and lower air ducts are provided with alternately arranged baffle wals 55c which are a continuation of the lower walls 52c of the lowermost and uppermost air ducts. The intermediate air duct is not provided at its side edges with baffle walls so that the hot furnace gases may pass over the surfaces 52c of all of the air ducts, and only over the upper surfaces 51c of the two lowermost air ducts. After the hot furnace gases pass over the surfaces 51c and 52c of the lowermost air ducts, they pass upwardly and over the top surface 51c of the uppermost air duct to the flue collar 35c.

In the further modified form of the invention shown in Figure 7 the inner heat exchanger casing 6d is formed with a bottom wall 29d, side walls 30d, end walls 31d and a top wall 33d. In this form of the invention, four superposed air ducts are employed and are arranged in horizontal spaced apart relation. The air ducts are each formed of sheet metal upper and lower walls 51d and 52d of relatively thin section, as previously described and the edges are connected by side walls 53d likewise of metal of relatively thin section. The lower walls 52d of the superposed air ducts are provided with alternately arranged extensions 55d which form baffle walls extending laterally and terminating a slight distance from the side walls 30d of the heat exchanger casing 6d. Thus, a sinuous passageway is formed for the furnace gases during their passage from each side of the firebox to the flue collar 35d.

In the still further modified form of the invention shown in Figure 8, the heat exchanger casing 6e includes a bottom wall 29e, side walls 30e, end walls 31e and a top wall 33e, which are formed of sheet metal of thin section as previously described in connection with the other forms of the invention. In the form of the invention shown in Figure 8, a series of horizontally disposed flat air ducts are arranged in superposed staggered relation to form a sinuous passageway for the furnace gases as indicated by the arrows. The air ducts are formed of upper and lower walls 51e and 52e connected at their side edges by side walls 53e, and it is to be noted that the upper and lowermost ducts are mounted so that one of their end walls is adjacent the left hand side wall 30e of the casing 6e, while the intermediate air duct has its side edge spaced adjacent the other side wall 30e of the inner heat exchanger casing 6e. This structure provides a sinuous furnace gas pathway, and in addition permits a small portion of the furnace gases to escape around the alternate ends or side edges of the air ducts to heat the walls 30e of the inner casing 6e throughout their entire area. The air ducts formed by the upper, lower and side walls 51e to 53e are connected so that their open ends project through correspondingly shaped openings in the end walls 31e of the heat exchanger casing 6e.

In all of the modified forms of the invention shown in Figures 3, 5 to 8 inclusive the inner heat exchanger casing is intended to be substituted for the one shown in Figures 1, 2 and 4, and it is to be understood that the inner casing will be spaced from the outer furnace casing in substantially the same manner for the passage of forced air circulation.

I claim:

1. In a warm air furnace, a horizontal casing, a firebox mounted in the lowermost portion of said casing and having opposed openings facing the ends of said casing for the passage of furnace gases toward both ends thereof, an air duct extending horizontally through the casing adjacent the firebox with the ends thereof extending beyond said firebox and arranged adjacent said openings, and a combustion gas outlet positioned in said casing on the side of said air duct which is remote from said firebox.

2. In a warm air furnace, an elongated furnace casing, a firebox mounted in the furnace casing, said firebox being provided with openings facing the ends of said casing for the passage of furnace gases towad both ends of said casing, a flat air duct extending horizontally through said furnace casing with both ends thereof projecting beyond said firebox in the path of said furnace gases, said flat air duct extending substantially the width of the casing with at least one edge thereof spaced from a side wall of the casing to form a passage therepast, and a combustion gas outlet positioned in said casing adjacent the side of said air duct which is remote from said firebox.

3. In a warm air furnace, inner and outer horizontal furnace casings arranged with their walls in spaced relation, an air inlet and an air outlet positioned in opposing end walls of said outer furnace casing, a firebox located centrally within said inner casing having a pair of opposed openings facing the ends of said inner casing for the passage of hot furnace gases in a direction toward the opposite ends of the inner casing, at least one air duct extending through the inner casing from one end to the other above the firebox with its ends projecting beyond said firebox in thermal transfer relation with the furnace gases passing outwardly through said opposed openings, and a combustion gas flue opening into said inner furnace casing above the uppermost air duct and extending through said outer casing.

4. In a warm air furnace, inner and outer elongated horizontal casings arranged with their walls in spaced relation one from the other, an air inlet and an air outlet positioned in opposing end walls of said outer furnace casing, a firebox mounted in the inner casing and intermediate the ends thereof having openings facing the ends of said inner casing for the passage of furnace gases in a direction toward opposite ends of the inner casing, a series of relatively flat air ducts extending through the inner casing from one end to the other above said firebox with their ends projecting above and beyond said openings therein in heat transfer relation with the furnace gases from said firebox, and a combustion gas flue opening into said inner casing above the uppermost air duct and extending through said outer casing.

5. In a warm air furnace, inner and outer furnace casings having their corresponding walls in spaced-apart relation to form an air passage around said inner casing, an air inlet and an air outlet positioned in the end walls of said outer furnace casing, a firebox mounted in the inner casing in spaced relation from the ends thereof and having openings facing the ends of said inner casing for the passage of furnace gases in a direction toward opposite ends of the inner casing, and air ducts mounted above said firebox and extending through the inner casing from one end to the other with their ends projecting beyond said firebox in spaced-apart relation one from the other, said air ducts being flat and extending the length of the inner casing and substantially the entire width thereof with at least one edge thereof spaced from a side wall of the inner casing to form a passage therepast, and a combustion gas flue openings into said inner casing above the uppermost air duct and extending through said outer casing.

6. In a warm air furnace, inner and outer furnace casings arranged with their walls in spaced relation, an air inlet and an air outlet positioned in the end walls of said outer furnace casing, a firebox mounted in the inner casing intermediate its ends and having openings in a pair of opposed walls for the passage of furnace gases in a direction toward the opposite ends of the inner casing, a series of substantially flat, horizontally disposed air ducts arranged in superposed, spaced relation above said firebox, and extending through the end walls of the inner casing, with their end portions projecting beyond said firebox and disposed above said openings in the path of said furnace gases, and a combustion gas flue opening into said inner casing above the uppermost air duct and extending through said outer casing.

7. In a warm air furnace, inner and outer furnace casings arranged with their walls in spaced realtion, an air inlet and an air outlet positioned in the end walls of said outer furnace casing, a firebox mounted in the inner casing intermediate its ends and having openings in a pair of opposed walls for the passage of furnace gases in a direction toward the opposite ends of the inner casing, and a series of substantially flat, horizontally disposed air ducts arranged in superposed, spaced relation above said firebox, and extending through the end walls of the inner casing with the end portions projecting beyond said firebox and above said openings in the path of said furnace gases, said air ducts being provided with baffle walls along the sides thereof arranged in staggered relation to form a sinuous pathway for the furnace gases, and a combustion gas flue opening into said inner casing above the uppermost air duct and extending through said outer casing.

8. In a warm air furnace, inner and outer rectangular furnace casings arranged horizontally with their walls in spaced relation, an air inlet and an air outlet positioned in the end walls of said outer furnace casing, a firebox located centrally within the inner casing and provided with furnace gas openings facing the ends of said inner casing for the passage of furnace gases toward both ends of said inner furnace casing, a series of relatively flat air ducts extending through the inner casing from one end to the other in superposed, spaced relation, and arranged with their end portions projecting beyond said firebox and above said openings in the pathway of said furnace gases, certain of said air ducts being provided with alternatively arranged baffle walls to form a sinuous passageway for the furnace gases discharged through said openings in the firebox, and a combustion gas flue opening into said inner casing above the uppermost air duct and extending through said outer casing.

9. In a warm air furnace, inner and outer furnace casings having their corresponding walls in spaced relation to form an air passage around said inner casing, an air outlet and an air inlet positioned in the end walls of said outer furnace casing, means at one end of the outer casing for creating a forced circulation of air through said air passage, a firebox located within the inner casing intermediate its ends having furnace gas openings in opposed walls thereof facing the ends of the inner casing, a series of relatively wide flat air ducts communicating with said air passage adjacent the opposite ends thereof to receive a portion of the air from said inlet and discharge it adjacent said outlet, said ducts extending through the inner casing with the opposite end portions of each air duct extending beyond the firebox and arranged above the furnace gas openings in the path of furnace gases passing upwardly therefrom, said ducts being positioned with the side edges slightly spaced from the side walls of the inner casing, and a combustion gas flue opening into said inner casing above the uppermost air duct and extending through said outer casing.

10. In a warm air furnace, inner and outer furnace casings having their corresponding walls in spaced relation to form an air passage, an air outlet and an air inlet positioned in the end walls of said outer furnace casing, an air blower mounted in one end of said outer casing for creating a forced circulation of air through said air passage, a firebox located intermediate the ends in said inner casing having openings in a pair of opposed walls thereof facing the ends of the inner casing for the passage of furnace gases in a direction toward each end of the inner casing, a flat air duct communicating with said air passage adjacent the opposite ends thereof to receive a portion of the air from said inlet and discharge it adjacent said outlet and extending through the inner casing and arranged with its side edges in spaced relation from the inner casing side walls, said air duct being arranged adjacent the firebox with the ends extending beyond the opposed walls and arranged adjacent the openings in the firebox, and a combustion gas flue opening into said inner casing adjacent the side of the air duct which is remote from said firebox and extending through said outer casing.

11. In a warm air furnace, inner and outer horizontal furnace casings arranged in spaced-apart relation to form an air passageway therebetween, means for creating a circulation of air through said passageway, an air outlet and an air inlet positioned in the end walls of said outer furnace casing, a firebox located within the inner casing intermediate its ends, and having openings facing the ends of said inner casing, a flat conduit forming an air duct communicating with said passageway adjacent the opposite ends thereof to receive a portion of the air from said inlet and discharge it adjacent said outlet and extending through said casing arranged above said firebox with its ends projecting beyond the firebox and disposed above said openings, said flat conduit being provided with a baffle wall along one side edge thereof, and a combustion gas flue opening into said inner casing above the air duct and extending through said outer casing.

12. In a warm air furnace, inner and outer furnace casings arranged with their walls in spaced relation to form an air passageway, an air outlet and an air inlet positioned in the end walls of said outer furnace casing, means for creating a circulation of air through said passageway, a firebox mounted within the inner casing intermediate its ends and having openings facing the ends of the inner casing in a pair of opposed walls for directing furnace gases toward the ends of the inner casing, a pair of relatively flat air ducts communicating with said passageway adjacent the opposite ends thereof to receive a portion of the air from said inlet and discharge it adjacent said outlet, and extending through the inner casing above the firebox with the ends projecting beyond said firebox and arranged above said openings in the pathway of the furnace gases passing through said openings, said air ducts being provided with baffles along alternate edges to form a sinuous furnace gas pathway, and a combustion gas flue opening into said inner casing above the uppermost air duct and extending through said outer casing.

13. In a warm air furnace, inner and outer furnace casings having their walls in spaced relation to provide an air passage therebetween, an air inlet and an air outlet positioned in the end walls of said outer casing, means for creating a forced circulation of air through said passage, a firebox mounted within said inner casing having openings facing the ends of the inner casing in opposed walls for directing furnace gases toward opposite ends of the inner casing, a series of relatively flat air ducts communicating with said passage adjacent the opposite ends thereof to receive a portion of the air from said inlet and discharge it adjacent said outlet and arranged in superposed spaced relation above the firebox with their end portions positioned above the openings in the firebox and their side edges spaced a slight distance from the side walls of the inner casing, each of said flat air ducts being provided along one side edge with a baffle wall connecting the side wall of the inner casing, said baffle walls being staggered to provide a sinuous furnace gas pathway, and a combustion gas flue opening into said inner casing above the uppermost air duct and extending through said outer casing.

14. In a warm air furnace, inner and outer furnace casings with their walls in spaced relation to provide an air passage therebetween, an air outlet and an air inlet positioned in the end walls of said outer furnace casing, means for creating a forced circulation of air through said air passage, a firebox mounted in the inner casing intermediate its ends and having openings facing the ends of the inner casing in a pair of opposed walls for directing hot furnace gases toward opposite ends of the inner casing, a series of flat, horizontal air ducts communicating with said air passage adjacent the opposite ends thereof to receive a portion of the air from said inlet and discharge it adjacent said outlet and extending through the inner casing above the firebox in superposed spaced-apart relation with their side edges spaced a slight distance from the side walls of the inner casing, a flue stack in the upper portion of the inner casing above the uppermost air duct and extending through said outer casing for conducting the furnace gases to the atmosphere, the upper and lowermost air ducts being provided with baffle walls connecting the side walls of the inner casing for conducting the furnace gases from the ends of the inner casing in a sinuous pathway to the flue stack.

15. In a warm air furnace, inner and outer furnace casings arranged with their corresponding walls in spaced relation to form an air passage therebetween, an air outlet and an air inlet positioned in the end walls of said outer furnace casing, means in one end of said outer casing for creating a forced circulation of air through said air passage, a firebox mounted in the inner casing intermediate its ends and having openings facing the ends of the inner casing in a pair of opposed walls for directing furnace gases toward the ends of the inner casing, a series of flat air ducts communicating with said air passage and extending through the inner casing from end to end thereof and arranged in spaced superposed relation, a flue stack in the inner casing above the uppermost air duct and extending through said outer casing, baffle walls on one edge of each of the air ducts arranged alternately to provide a sinuous zig-zag passageway for the furnace gases, said baffle walls being slightly shorter in length than the air ducts to provide furnace gas passages on both sides of the air ducts adjacent the ends thereof, said baffles terminating a slight distance from the side walls of the inner casing.

16. In a warm air furnace, inner and outer, elongated furnace casings arranged horizontally in spaced relation to provide an air passage therebetween, an air outlet and an air inlet positioned in the end walls of said outer furnace casing, means in one end of the outer casing for creating a forced circulation of air through said passage, a firebox mounted in the inner casing intermediate its ends and having openings facing the ends of the inner casing in a pair of opposed walls for directing furnace gases toward opposite ends of the inner casing, a series of horizontally spaced, relatively flat air ducts, a flue mounted in the inner casing above the uppermost air duct and extending through said outer casing, said air ducts communicating with said passage adjacent the opposite ends thereof to receive a portion of the air from said inlet and discharge it adjacent said outlet and arranged in superposed, staggered relation above the firebox to provide a sinuous passageway from the ends of the inner casing toward the flue opening, the end portions of said air ducts extending beyond said firebox and disposed above the firebox openings in the path of furnace gases passing through said openings.

17. In a warm air furnace, inner and outer furnace casings having their walls in spaced relation to form an air passage therebetween, an air outlet and an air inlet positioned in the end walls of said outer furnace casing, means at one end of the casing for creating a forced circulation of air through said passage, a firebox located within said inner casing intermediate its ends and having openings facing the ends of the inner casing for directing furnace gases toward opposite ends of the inner casing, a relatively flat air duct communicating with said air passage and extending above said firebox and through said inner casing from one end to the other with its ends projecting beyond said firebox and arranged above the openings in the firebox in the pathway of furnace gases, said air duct having its side edges spaced a slight distance from the side walls of the inner casing and said air duct being provided with a baffle wall on one edge thereof formed from a continuation of the lower wall of the air duct, and a flue opening into said inner casing above the air duct and extending through said outer casing.

18. In a warm air furnace, an elongated furnace casing, a firebox mounted in the furnace casing, said firebox being provided with openings facing the ends of said casing for the passage of furnace gases toward both ends of said casing, conduit means extending horizontally through said furnace casing for conducting air to be heated by furnace gases, said conduit means projecting beyond the firebox in the path of said furnace gases and extending substantially the width of the casing with at least one edge thereof spaced from the side wall of the casing to form a passage therepast, and a combustion gas outlet positioned in said casing adjacent the side of said conduit means which is remote from said firebox.

19. In a warm air furnace, inner and outer furnace casings having their corresponding walls in spaced-apart relation to form an air passage around said inner casing, an air inlet and an air outlet positioned in the end walls of said outer furnace casings, a firebox mounted in the inner casing in spaced relation from the ends thereof and having openings facing the ends of said inner casing for the passage of furnace gases in a direction toward opposite ends of the inner casing, air conducting means mounted adjacent said firebox and extending through the inner casing from one end to the other with its ends projecting beyond said firebox, said air conducting means extending the length of the inner casing and substantially filling a zone occupying substantially the entire width of said inner casing, at least one edge of said air conducting means being spaced from a side wall of the inner casing to form a passage therepast, and a combustion gas flue opening into said inner casing adjacent the side of said air conducting means which is remote from said firebox and extending through said outer casing.

20. In a warm air furnace, inner and outer furnace casings having their corresponding walls in spaced-apart relation to form an air passage around said inner casing, an air inlet and an air outlet positioned in the end walls of said outer furnace casing, a firebox mounted in the inner casing in spaced relation from the ends thereof having openings in its opposed end walls for the passage of furnace gases in a direction toward opposite walls of the inner casing, an air duct extending through the inner casing from one end to the other with its end portions each projecting beyond said firebox and extending beyond said openings therein, and a combustion gas flue opening into said inner casing adjacent the side of said air duct which is remote from said firebox and extending through said outer casing.

21. In a warm air furnace, an elongated furnace casing, a firebox mounted in the furnace casing, said firebox being provided with openings facing the ends of said casing for the passage of furnace gases toward both ends of said casing, conduit means extending horizontally through said furnace casing for conducting air to be heated by said furnace gases, said conduit means projecting beyond the firebox in the path of said furnace gases and being of less width than said casing to form at least one passage leading from the side of said means adjacent the firebox to the side thereof remote from said firebox, and a combustion gas outlet positioned in said casing on the side of said conduit means remote from said firebox.

22. In a warm air furnace, inner and outer furnace casings having their corresponding walls in spaced-apart relation to form an air passage around said inner casing, an air inlet and an air outlet positioned in the end walls of said outer furnace casing, a firebox mounted in the inner casing in spaced relation from the ends thereof and having openings facing the ends of said inner casing for the passage of furnace gases in a direction toward opposite ends of the inner casing, air conducting means mounted adjacent said firebox and extending through the inner casing from one end to the other with its ends projecting beyond said firebox, said air conducting means extending the length of the inner casing and substantially filling a zone extending substantially the width of said inner casing, said air conducting means being of less width than said casing to form at least one passage for combustion gases to pass from the side of said air conducting means adjacent said firebox to the side thereof remote from said firebox, and a combustion gas flue opening into said inner casing on the side of said air conducting means remote from said firebox and extending through said outer casing.

References Cited in the file of this patent

UNITED STATES PATENTS

| Number | Name | Date |
|---|---|---|
| 559,918 | Twitchell | May 12, 1896 |
| 924,815 | Nelson | June 15, 1909 |
| 1,634,706 | Carroll | July 5, 1927 |
| 1,935,852 | Long | Nov. 21, 1933 |
| 2,157,643 | Westwick | May 9, 1939 |
| 2,299,901 | Johnston | Oct. 27, 1942 |
| 2,402,595 | Blair | June 25, 1946 |